(12) United States Patent
Lim et al.

(10) Patent No.: US 9,590,810 B2
(45) Date of Patent: Mar. 7, 2017

(54) DEVICE SECURITY

(71) Applicant: Infineon Technologies AG, Neubiberg (DE)

(72) Inventors: Cheow Guan Lim, Singapore (SG); Robert Rozario, San Jose, CA (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/684,964

(22) Filed: Apr. 13, 2015

(65) Prior Publication Data

US 2016/0301532 A1    Oct. 13, 2016

(51) Int. Cl.
*H04L 9/32* (2006.01)
*G06F 12/14* (2006.01)

(52) U.S. Cl.
CPC ........ *H04L 9/3263* (2013.01); *G06F 12/1408* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 5,995,625 A * | 11/1999 | Sudia | G06F 21/6209 705/51 |
| 6,212,635 B1 * | 4/2001 | Reardon | G06F 21/34 380/30 |
| 2008/0086633 A1 * | 4/2008 | Anderson | H04L 9/321 713/156 |
| 2008/0134237 A1 * | 6/2008 | Tu | H04N 5/44543 725/38 |

* cited by examiner

*Primary Examiner* — Brandon Hoffman
(74) *Attorney, Agent, or Firm* — Schiff Hardin LLP

(57) ABSTRACT

Methods for securing and activating chips and/or devices that can utilize a hardware security module (HSM). One or more of the methods can include generating one or more digital certificates based on an identification (ID) associated with a device, generating one or more activation certificates and one or more modified activation certificate based on one or more encryption keys, and generating one or more chip data certificates and/or one or more modified chip data certificates.

20 Claims, 7 Drawing Sheets

DEVICE SECURITY

BACKGROUND

Field

Embodiments described herein generally relate to authentication and activation in electronic devices, including authentication and activation of chips used in the manufacture of devices implementing such chips.

Related Art

Generally, chip manufacturers can provide chips to product manufactures in an unlocked state. The unlocked state allows for potential altering and/or cloning of the chips that have been intercepted during shipment to product manufacturer(s).

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

By way of overview, a chip manufacturer can perform one or more securing processes to secure chips prior to providing the chips to, for example, product manufacturers. Upon receipt of the secured chips, the product manufacturers can perform one or more activation processes to enable access to the chips. In exemplary embodiments, the chip manufacturer, product manufacturer and/or one or more other authorized entities can utilize a hardware security module (HSM) as described in detail below to secure and/or activate one or more chips.

Hardware Security Module (HSM)

Figure 1A:
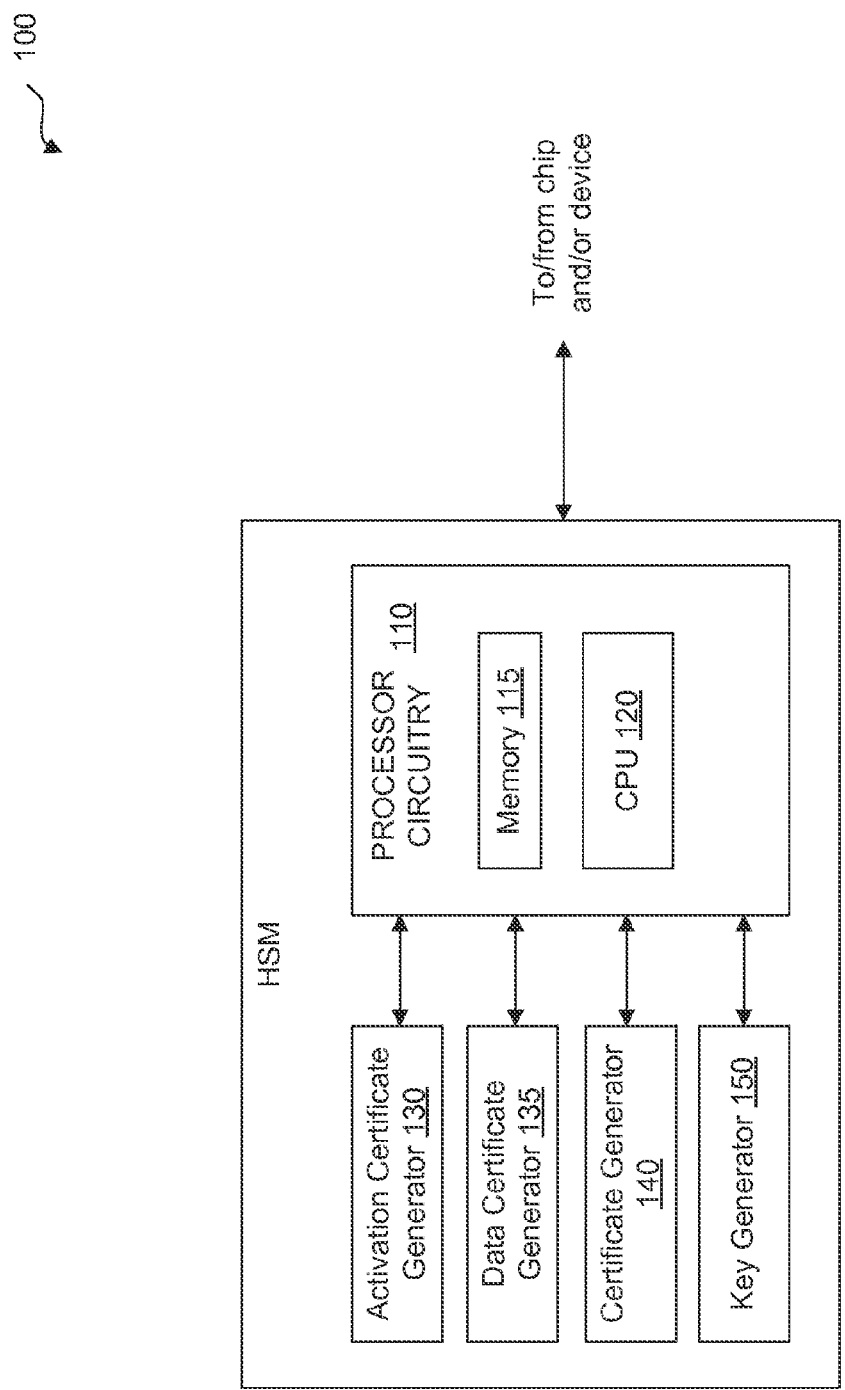
FIG. 1A illustrates a hardware security module according to an exemplary embodiment of the present disclosure.
Figure 1B:
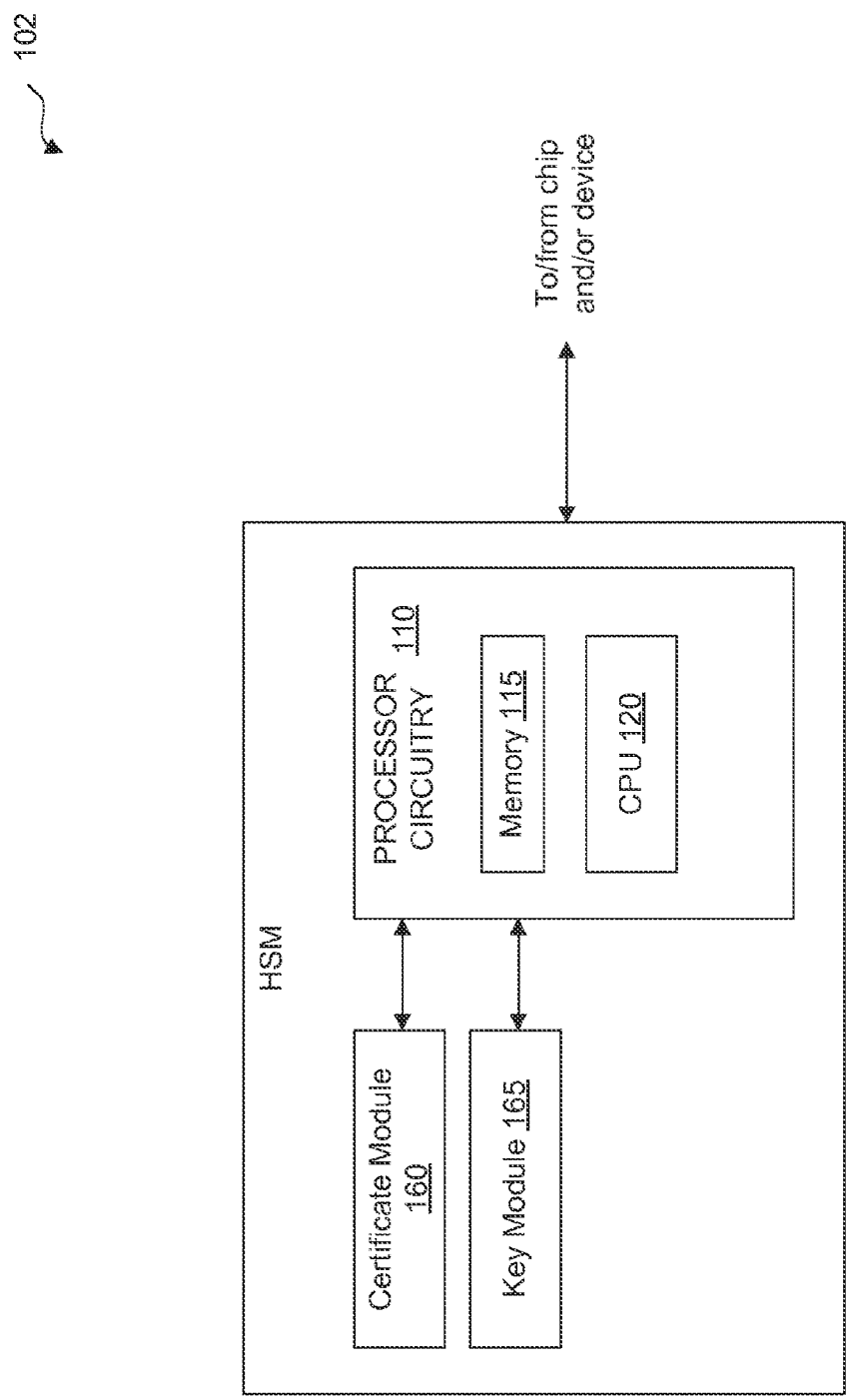
FIG. 1B illustrates a hardware security module according to an exemplary embodiment of the present disclosure.

FIGS. 1A and 1B illustrate hardware security modules (HSM) 100 and 102, respectively, according to exemplary embodiments of the present disclosure. FIGS. 1A and 1B will be described with reference to FIG. 2, which illustrates a memory structure 200 according to an exemplary embodiment of the present disclosure.

In operation, the HSM 100 can be utilized by, for example, a product manufacturer to secure one or more products (e.g., chips) during or after the manufacturer of the product. In this example, another HSM 100 can be provided to one or more downstream manufacturers implementing the manufactured product into the device(s). Here, the later HSM 100 can be used to activate and/or authenticate the product to be implemented in their devices.

The HSM 100 can include processor circuitry 110, an activation certificate generator 130, a data certificate generator 135, a certificate generator 140, and a key generator 150. In exemplary embodiments, the HSM 100 can be communicatively coupled to one or more chips and/or devices having one or more chips implemented therein, and configured to perform one or more authentication and/or activation procedures to authenticate and/or activate the chip(s)/device(s). For the purposes of this discussion, the one or more authentication and/or activation procedures can be collectively referred to as activation procedures, activation, activating, or the like unless otherwise noted. In exemplary embodiments, the HSM 100 can be configured to read and/or write data and/or instructions from/to memory within the chip(s)/device(s) to activate the chip(s)/device(s). Further, the HSM 100 can be configured to encrypt data, one or more memory location addresses, and/or one or more parameters using one or more encryption processes. For example, the HSM 100 can encrypt chip data, one or more of the certificates (e.g., AC, AC^, CDC, DC, DC^, etc., as described in detail below) and/or one or more addresses corresponding to one or more memory locations.

The processor circuitry 110 includes one or more processors, circuitry, and/or logic that are configured to control the overall operation of the HSM 100, including performing one or more authentication and/or activation procedures. In an exemplary embodiment, the processor circuitry 110 includes a memory 115 and one or more central processing units (CPUs) 120. The processor circuitry 110 can be configured to read identification information (IDs) from a chip/device connected to the HSM 100 and/or generate one or more IDs associated with a connected chip/device based on information received from the connected chip/device. In an exemplary embodiment, each chip/device can be associated with a unique ID.

In an exemplary embodiment, the processor circuitry 110 can be configured to generate an ID based on a wafer location, a batch number, model number, revision number, manufacture date, and/or one or more other parameters that are received from the connected chip/device. Similarly, in embodiments where the processor circuitry 110 reads an ID from a connected chip/device, such ID can be based on one or more of these parameters.

The memory 115 can store data and/or instructions that when executed by the CPU(s) 120 causes the CPU(s) 120 to perform the functions described herein. The memory 115 can be any well-known volatile and/or non-volatile memory, and can be non-removable, removable, or a combination of both.

The CPU(s) 120 can include one or more microprocessors, one or more digital signal processors (DSP), and/or one or more other hardware processors. The CPU(s) 120 can be "hard-coded" with instructions to perform corresponding function(s) according to embodiments described herein. Alternatively, the CPU(s) 120 can access the memory 115 to retrieve data and/or instructions stored in the memory 115, which when executed by the CPU(s) 120, perform the corresponding function(s) according to embodiments described herein.

The activation certificate generator 130 includes one or more processors, circuitry, logic and/or code that are configured to generate one or more activation certificates (AC) associated with a chip and/or device. In an exemplary embodiment, the activation certificate generator 130 can be configured to generate one or more ACs based on one or more encryption keys and one or more IDs associated with one or more chips/devices. For example, the activation certificate generator 130 can be configured to perform one or more hash functions, including one or more cryptographic hash functions, on an ID using one or more encryption keys to generate one or more ACs.

Figure 2:
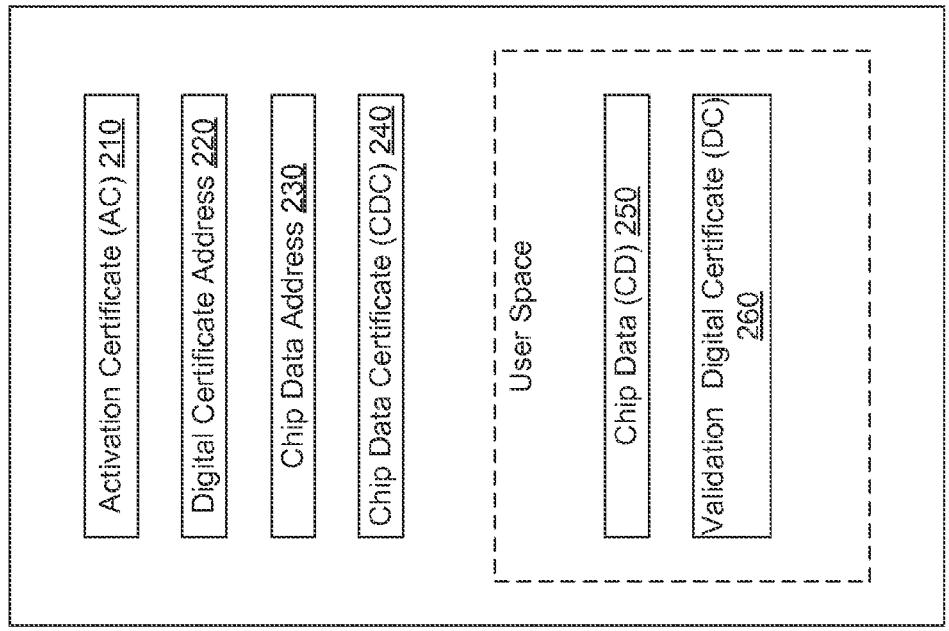
FIG. 2 illustrates a memory structure according to an exemplary embodiment of the present disclosure.

In an exemplary embodiment, an AC is a signature or other indicator that identifies the activation status of the chip/device, and is stored at an AC memory location within the memory of the chip/device (e.g., AC 210 in FIG. 2). For example, the AC can initially have a value that signifies that the chip/device is in a pre-activation state (i.e., has not yet been activated). In an exemplary embodiment, the initial value of the AC can be a unique number known to the HSM 100, and may be associated with, for example, the HSM 100, the chip, the chip manufacture, the device, the device manufacturer, and/or have one or more other associations as will be understood by one of ordinary skill in the relevant art. Following a successful activation, the AC value stored at the AC memory location can be rewritten with a value that signifies that the chip/device has been successfully activated.

In an exemplary embodiment, the activation certificate generator 130 can be configured to generate a modified activation certificate (AC^) based on an ID associated with a chip/device and one or more encryption keys. For example, the activation certificate generator 130 can be configured to perform one or more hash functions, including one or more cryptographic hash functions, on an ID using one or more encryption keys to generate an AC^. In an exemplary embodiment, the activation certificate generator 130 can be configured to generate an AC based on an ID using a first encryption key and to generate an AC^ based on the ID using a second encryption key different from the first encryption key. However, the disclosure is not limited to using different encryption keys, and the activation certificate generator 130 can be configured to generate an AC and an AC^ utilizing the same encryption key and different hash functions. For example, the AC can be generated using a first hash function and an encryption key, and the AC^ can be generated using a second hash function different from the first hash function and the same encryption key. The AC^ value can be stored in the AC memory location (e.g., AC 210 in FIG. 2). In operation, the AC value and the AC^ value can be used to indicate whether the chip/device is in a pre-activation state (i.e., has not yet been activated) or in an activated state (i.e., has been activated), respectively.

The data certificate generator 135 includes one or more processors, circuitry, logic and/or code that are configured to generate one or more data certificates associated with data of one or more chips and/or devices. In an exemplary embodiment, a chip data certificate (CDC) is a certificate that identifies (or can be used to determine) the validity/authenticity of data associated with one or more chips and/or devices. The CDC can be generated based on the data and/or one or more other parameters associated with the chip/device. In an exemplary embodiment, the data certificate generator 135 can be configured to generate a CDC based on one or more activation certificates (AC), chip data, and an encryption key (e.g., chip data encryption key (CDEK) as discussed below). In an exemplary embodiment, the data certificate generator 135 can be configured to perform one or more hash functions, including one or more cryptographic hash functions, on an AC and chip data using one or more encryption keys (e.g., CDEK) to generate the CDC.

The data and/or parameter(s) can be received from the chip/device and/or otherwise provided to the HSM 100. In operation, the CDC value can be stored in a CDC memory location (e.g., CDC 240 in FIG. 2). In an exemplary embodiment, the CDC can be encrypted through one or more well-known encryption processes using one or more encryption keys.

The certificate generator 140 includes one or more processors, circuitry, logic and/or code that are configured to generate one or more validation digital certificates (DC) associated with one or more chips and/or devices. In operation, a validation digital certificate can be used to validate one or more activation processes.

In an exemplary embodiment, the certificate generator 140 can be configured to generate a modified validation digital certificate (DC^) based on a DC and a modified activation certificates AC^. In an exemplary embodiment, the certificate generator 140 can be configured to perform an "exclusive or" (e.g., xor, exclusive disjunction, etc.) logical operation on the DC and AC^ to generate the modified digital certificate (DC^). For example, the certificate generator 140 can be configured to generate a modified validation digital certificate (DC^) that satisfies the following equation: DC^=DC⊕AC^. The generation of the modified validation digital certificate is not limited to the use of an "exclusive or" logical operation, and the generation of the modified digital certificate can utilize one or more other logical operations and/or one or more other mathematical operations as would be understood by one of ordinary skill in the relevant arts.

The key generator 150 includes one or more processors, circuitry, logic and/or code that are configured to generate and/or maintain one or more encryption keys. The encryption keys can be, for example, public and/or private encryption keys. In an exemplary embodiment, the key generator 150 can be configured to generate one or more encryption keys and to store the generated encryption keys in the key generator 150. In an alternative embodiment, previously generated encryption keys can be provided to, and stored in, the key generator 150. The previously generated encryption keys can be generated by, for example, the manufacturer of the HSM 100, the operator of the HSM 100, the manufacturer of the chip/device processed by the HSM 100, etc.

In an exemplary embodiment, the key generator 150 generates and/or maintains a first activation encryption key (AEK1), a second activation encryption key (AEK2), and a chip data encryption key (CDEK). The present disclosure is not limited to these keys, and the key generator 150 can generate and/or maintain one or more other encryption keys in addition to, or alternatively to, the AEK1, AEK2, and CDEK. In an exemplary embodiment, AEK1, AEK2 and CDEK are different encryption keys. However, the present disclosure is not limited to using different encryption keys, and two or more of the encryption keys can be the same.

In operation, the HSM 100 can be configured to generate and/or process various data and/or other information, and/or read/write such data/information from/to one or more chips/devices. For example, the HSM 100 can generate, process, and/or read/write one or more of the following: data, one or more parameters, one or more ACs, one or more ACs^, one or more CDCs, one or more DCs, one or more DCs^, and/or other data or information as would be understood by one of ordinary skill in the relevant arts. In an exemplary embodiment, the HSM 100 can be configured to read and/or write data from/to a memory structure 200 as described in detail with reference to FIG. 2.

The memory structure 200 can include one or more volatile and/or non-volatile memories that can store data and/or instructions. In an exemplary embodiment, the memory structure 200 is implemented in a chip or other device that is configured for activation by the HSM 100.

In an exemplary embodiment, the memory structure 200 includes the various memory locations: activation certificate (AC) memory location 210, digital certificate memory location 220, chip data address memory location 230, chip data certificate (CDC) memory location 240, chip data (CD) memory location 250, and validation digital certificate memory location 260. The CD memory location 250 and validation digital certificate memory location 260 memory locations can collectively be referred to as a user space.

The AC memory location 210 can store one or more activation certificates, including, for example, one or more ACs and/or one or more ACs^. The digital certificate memory location 220 can store one or more DCs and/or modified digital certificates (DC^). The DC memory location 220 can also store one or more IDs associated with one or more chips/devices that are configured for activation by the HSM 100. The chip data address memory location 230 can store one or more memory addresses corresponding to one or more memory locations of the chip data (CD) 250. For example, the chip data address memory location 230 can store a memory address that corresponds to the memory location within the user space (i.e., CD memory location 250) that stores chip data. In an exemplary embodiment, the chip data memory location 250 can be randomly determined by the HSM 100. The CDC memory location 240 can store one or more chip data certificates (CDCs) that are associated with chip data stored in the CD memory location 250. The validation digital certificate memory location 260 can store one or more validation digital certificates (DC) and/or DCs^ that can be utilized by the HSM 100 to validate and activation process of a corresponding chip/device.

In an exemplary embodiment, the HSM 102 can include processor circuitry 110, certificate module 160 and key module 165. For brevity, discussion of the processor circuitry 110 has been omitted.

The certificate module 160 can include one or more processors, circuitry, and/or logic that are configured to store and/or maintain one or more certificates. For example, the certificate module 160 can store and/or maintain one or more activation certificates (AC), one or more modified activation certificate (AC^), one or more chip data certificate (CDC), one or more validation digital certificates (DC), one or more modified validation digital certificate (DC^), and/or one or more other certificates as would be understood by one of ordinary skill in the relevant arts.

The key module 165 can include one or more processors, circuitry, logic and/or code that are configured to store and/or maintain one or more encryption keys. The encryption keys can be, for example, public and/or private encryption keys. In an exemplary embodiment, one or more keys are provided to and stored in the key module 165. In an exemplary embodiment, the key module 165 stores and/or maintains a first activation encryption key (AEK1), a second activation encryption key (AEK2), a chip data encryption key (CDEK), and/or one or more other keys as would be understood by one of ordinary skill in the relevant arts. In an exemplary embodiment, AEK1, AEK2 and CDEK are different encryption keys. However, the present disclosure is not limited to using different encryption keys, and two or more of the encryption keys can be the same.

In operation, the HSM 102 can be configured to perform one or more authentication and/or activation procedures using one or more keys of the key module 165 and one or more certificates of the certificate module 160. For example, the HSM 102 can be used to activate and/or authenticate a product in the field, in the consumer market place, etc. In this example, the HSM 102 can be preconfigured with the keys and/or certificates needed to perform one or more authentication and/or activation processes instead of generating the keys and/or certificates during such processes.

Securing Process

Figure 3:
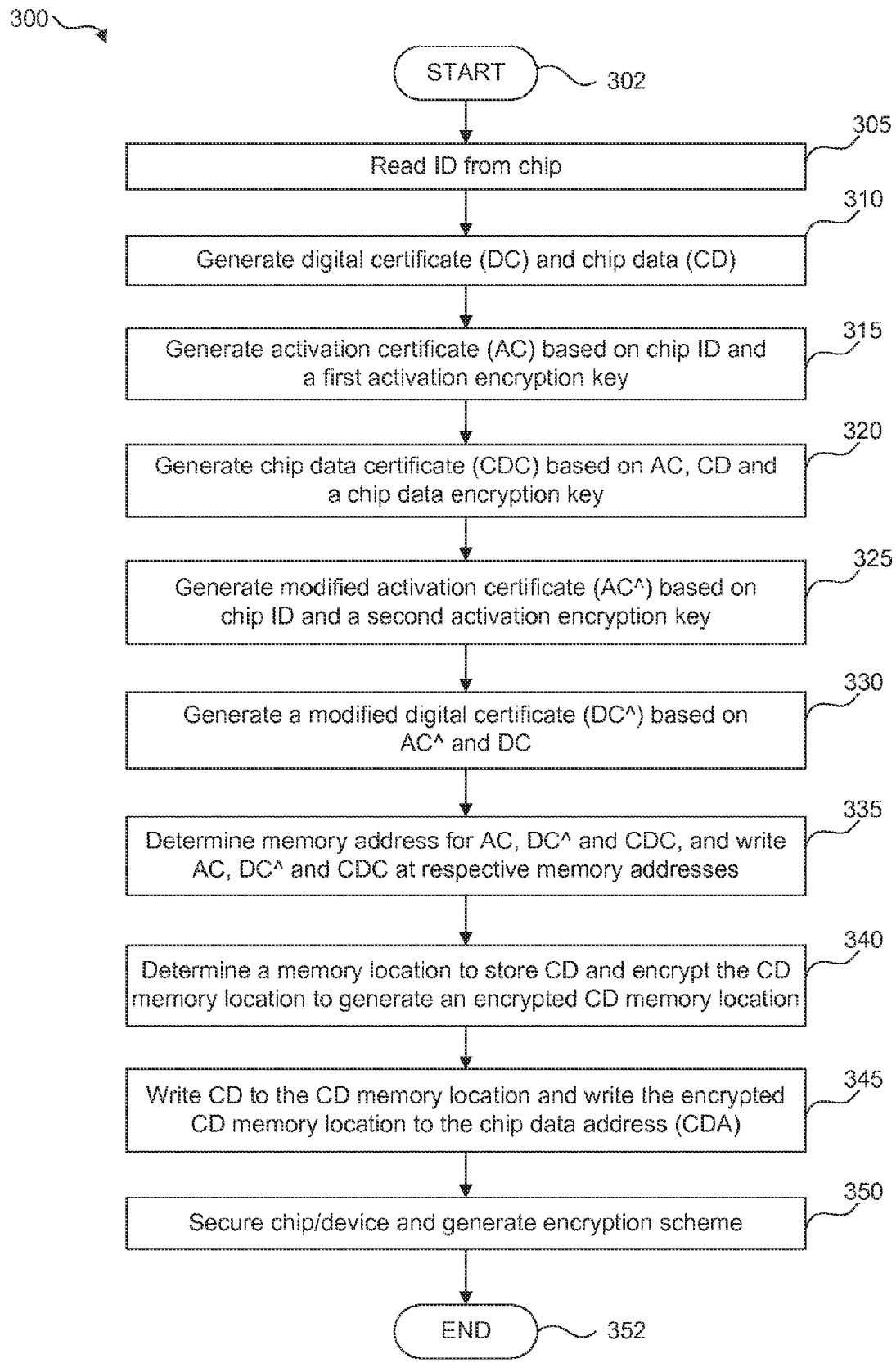
FIG. 3 illustrates a method for securing a device according to an exemplary embodiment of the present disclosure.

FIG. 3 illustrates a flowchart 300 of a method for securing a device in accordance with an exemplary embodiment of the present disclosure. The method of flowchart 300 is described with continued reference to one or more of FIGS. 1-2. The steps of the method of flowchart 300 are not limited to the order described below, and the various steps may be performed in a different order. Further, two or more steps of the method of flowchart 300 may be performed simultaneously with each other.

The method of flowchart 300 begins at step 302 and transitions to step 305, where one or more IDs are read from a chip/device. For example, HSM 100 can be configured to read an ID from a chip communicatively coupled to the HSM 100. In an exemplary embodiment, the HSM 100 can be configured to read information and/or other data from the chip/device and to generate an ID based on the read information/data.

After step 305, the flowchart 300 transitions to step 310, where one or more validation digital certificates (DC) and/or chip data (CD) is generated. In exemplary embodiment, the HSM 100 is configured to generate one or more DC's and/or chip data, which may be written to one or more memory locations of a chip/device (e.g., memory structure 200). In an exemplary embodiment, HSM 100 can be configured to encrypt the DCs and/or the CD using one or more encryption processes.

After step 310, the flowchart 300 transitions to step 315, where one or more activation certificates (AC) are generated based on a chip ID and an encryption key. In an exemplary embodiment, the AC is generated based on the chip ID read from the chip communicatively coupled to the HSM 100 and the first activation encryption key (AEK1). For example, the activation certificate generator 130 can be configured to perform a hash functions on the ID using the AEK1 to generate the AC.

After step 315, the flowchart 300 transitions to step 320, where one or more chip data certificates (CDC) are generated based on an activation certificate (AC), chip data (CD), and an encryption key. In an exemplary embodiment, the data certificate generator 135 can be configured to generate a CDC based on the generated AC, the chip data, and chip data encryption key (CDEK). For example, the data certificate generator 135 can be configured to perform a hash function on the AC and chip data using the CDEK to generate the CDC.

After step 320, the flowchart 300 transitions to step 325, where one or more modified activation certificates (AC^) are generated based on the chip ID and an encryption key. In an exemplary embodiment, the AC^ is generated based on the chip ID read from the chip communicatively coupled to the HSM 100 and the second activation encryption key (AEK2). For example, the activation certificate generator 130 can be configured to perform a hash functions on the ID using the AEK2 to generate the AC^. In this example, the hash function used to generate AC^ is the same hash function used to generate AC and the CDC. However, the present disclosure is not limited to this configuration, and two or more of the implementations of hash functions can utilize different hash functions. For example, the hash functions used to generate AC and AC^ can be the same hash function while the hash function used to generate CDC can be a different hash function.

After step 325, the flowchart 300 transitions to step 330, where a modified validation digital certificate (DC^) is generated based on a modified validation activation certificate (AC^) and a digital certificate (DC). For example, the DC^ can be generated based on the AC^ generated by the activation certificate generator 130 and the DC generated by the certificate generator 140. In an exemplary embodiment, the certificate generator 140 can be configured to perform an "exclusive or" logical operation on the DC and AC^ to generate the DC^.

After step 330, the flowchart 300 transitions to step 335, where memory address locations can be determined, and one or more ACs, DCs^, and CDCs can be written to the memory of a chip/device undergoing the activation process. In an exemplary embodiment, the HSM 100 can be configured to determine memory locations within the memory structure 200 and to write one or more ACs, DCs^, and CDCs to corresponding memory locations. For example, the HMS 100 can write an AC to the AC memory location 210, a DC^ to the digital certificate memory location 220, and a CDC to the chip data certificate memory location 240.

After step 335, the flowchart 300 transitions to step 340 where a chip data address corresponding to a memory location in which chip data can be stored is determined. In an exemplary embodiment, the HSM 100 is configured to generate a random chip data address at which chip data is to be stored. For example, the HSM 100 can randomly designate a memory location within the user space as the chip data memory location 250. In this example, the memory address within the chip data address memory location 230 is a random address corresponding to the randomly designated chip data memory location 250. In an exemplary embodiment, the HSM 100 can be configured to encrypt the chip data address using one or more encryption processes. That is, because the memory address is randomly designated and encrypted, the memory structure 200 securely stores the chip data at the chip data memory location 250.

The present disclosure is not limited to utilizing a random address, and the HSM 100 can generate a chip data address based on one or more of the various parameters (e.g., AC, CDC, DC, etc.) and/or other information processed by the HSM 100, and/or based on one or more functions of the parameters/information.

After step 340, the flowchart 300 transitions to step 345, where the chip data and encrypted chip data address can be written to the memory of a chip/device undergoing the activation process. In an exemplary embodiment, the HSM 100 can be configured to write the chip data to the memory location (e.g., chip data memory location 250) within the memory structure 200 that corresponds to the randomly designated memory address that is stored in the chip data address location 230. The HSM 100 can also write the encrypted chip data address to the chip data address memory location 230.

After step 345, the flowchart 300 transitions to step 350, where the chip/device is secured and the encryption scheme is generated. In an exemplary embodiment, the HSM 100 secures the chip/device, and the HSM 100, one or more chip IDs and an encryption scheme are associated with each other. For example, the HSM 100 can store one or more chip IDs read from a corresponding chip/device in memory 115 and associate one or more encryption keys (e.g., AEK1, AEK2, CDEK, etc.) used in the activation process with the corresponding chip IDs. In operation, HSM 100 and the corresponding encryption scheme may be provided to one or more manufacturers or other commercial entities for use in an activation process, including, for example, the activation method described below with reference to FIGS. 4A-4C.

After step 350, the flowchart 300 transitions to step 352, where the flowchart ends.

Activation Processes

Figure 4A:
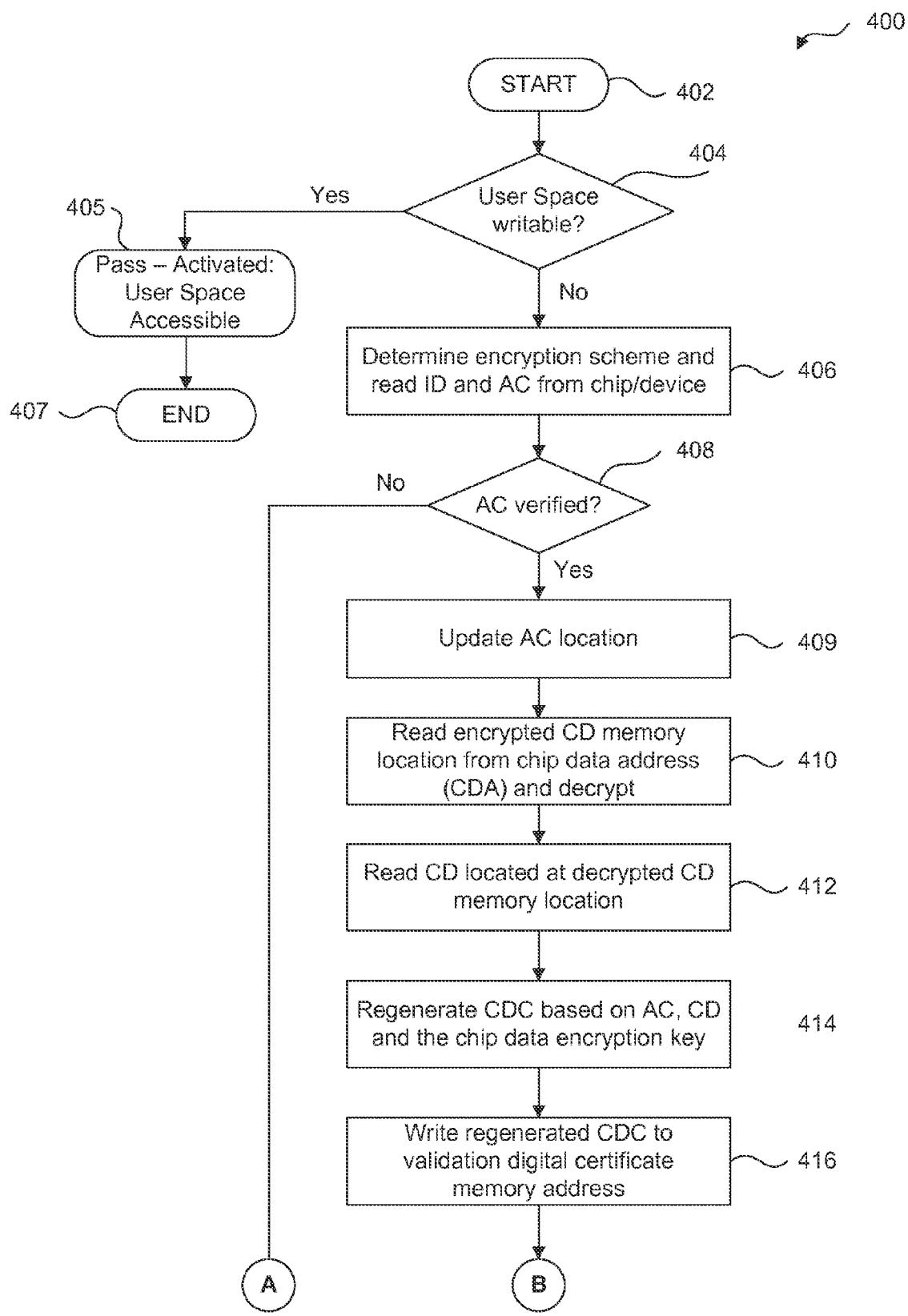
FIGS. 4A-4C illustrate methods for activating a device according to exemplary embodiments of the present disclosure.
Figure 4B:
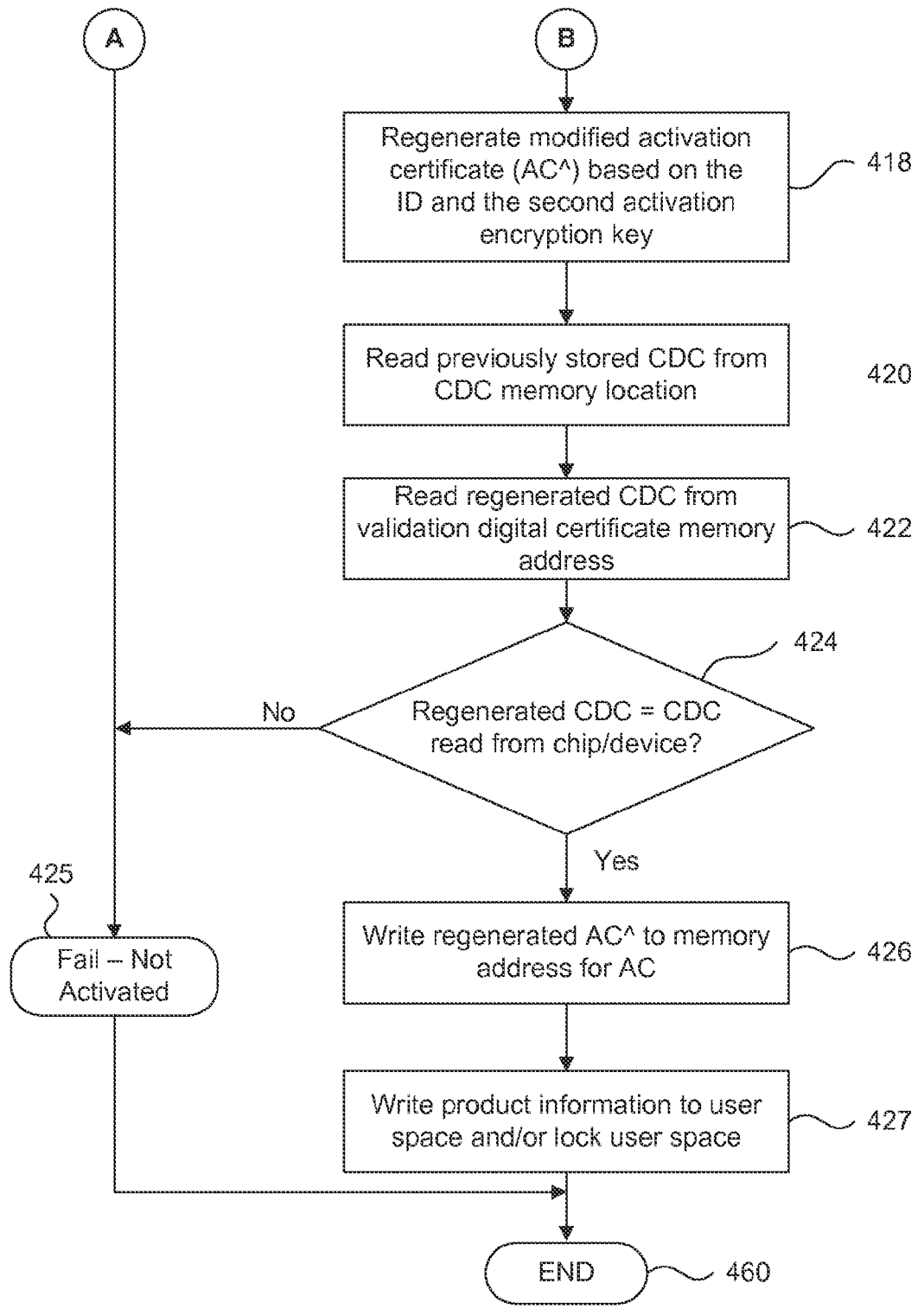
Figure 4C:
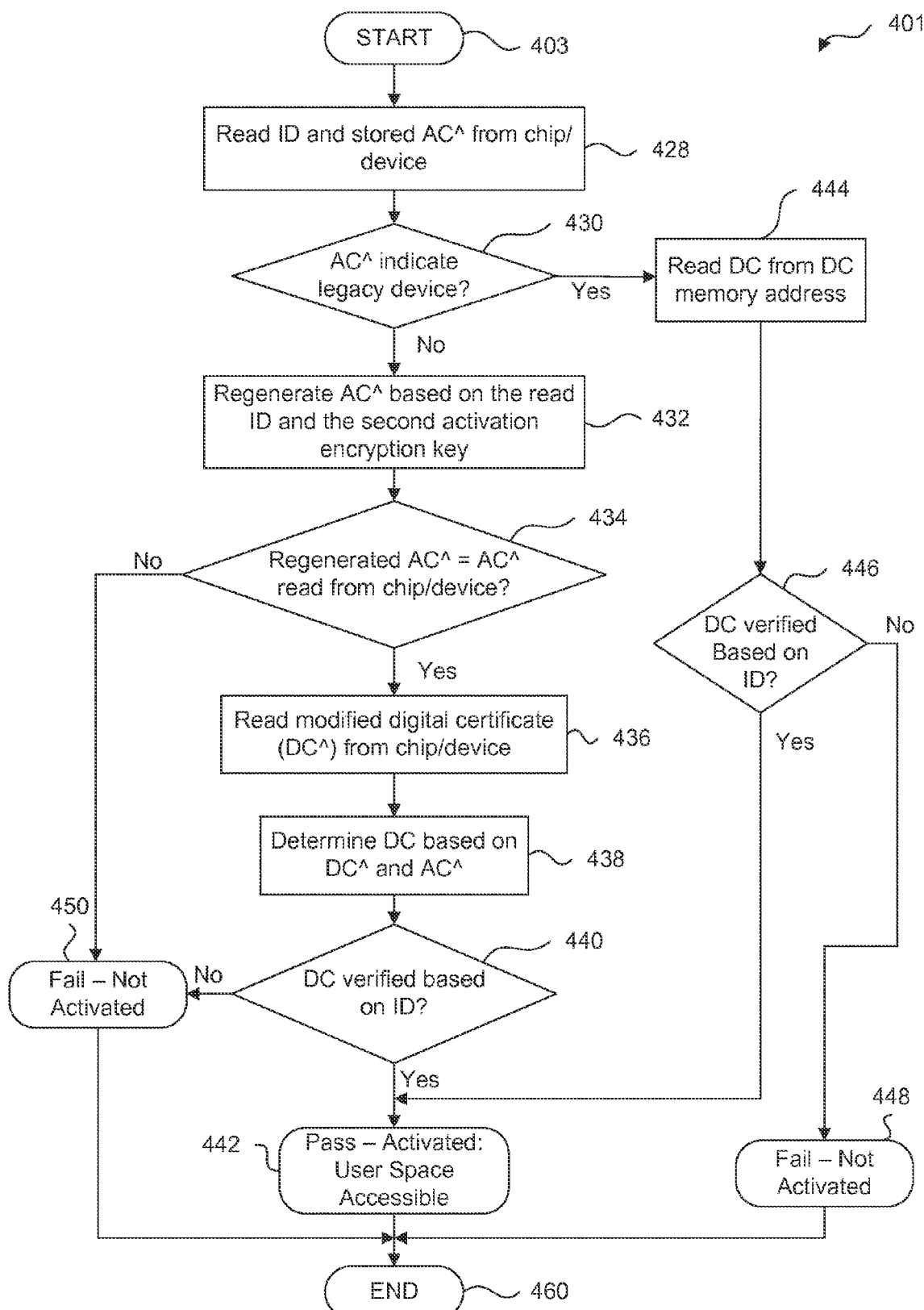

FIGS. 4A-4C illustrate flowcharts 400 and 401 of methods for activating a device in accordance with exemplary embodiments of the present disclosure. The methods of flowcharts 400 and 401 are described with continued reference to one or more of FIGS. 1-3. The steps of the methods of flowcharts 400 and 401 are not limited to the order described below, and the various steps may be performed in a different order. Further, two or more steps of the methods of flowcharts 400 and 401 may be performed simultaneously with each other.

The method of flowchart 400 begins at step 402 and transitions to step 404, where it is determined if the user space of the memory structure 200 is accessible and writable. For example, the HSM 100 can determine if the user space is writable by attempting to access and write data to one or more memory locations within the user space. If the user space is writable (YES at step 404), the method of flowchart 400 transitions to step 405, where the HSM 100 determines that no activation is required and the user space of the memory structure 200 is accessible. After step 405, the flowchart 400 transitions to step 407 where the flowchart 400 ends. If the user space is not writable (NO at step 404), the method of flowchart 400 transitions to step 406.

At step 406, one or more encryption schemes are determined and one or more chip IDs and activation certificates are read from one or more communicatively coupled chips/devices. For example, the HSM 100 can read an ID and an activation certificate (AC) from a connected chip/device and store the information in memory 115. The HSM 100 can also determine one or more encryption schemes stored in memory 115. The encryption schemes can designate one or more encryption keys and/or hash functions to be utilized in the activation process. The encryption scheme can also identify one or more chip IDs as valid and authentic IDs.

After step 406, the method of flowchart 400 transitions to step 408, where the activation certificate (AC) read from the connected chip/device is verified. In an exemplary embodiment, the activation certificate generator 130 can be configured to regenerate an AC based on the read ID the first activation encryption key (AEK1). The HSM 100 can compare the regenerated AC value to the value of the AC read from the connected chip/device. If the regenerated AC value matches (e.g., is equal to) the value of the AC read from the connected chip/device, the HSM 100 can determined that the AC is verified (YES at step 408) and the method of flowchart 400 transitions to step 409. Otherwise, the HSM 100 can determine that the verification as failed (NO at step 408), and the method of flowchart 400 transitions to step 425 where the HSM 100 determines that the activation has failed and the user space remains inaccessible.

At step 409, the AC memory location (e.g., AC 210 in FIG. 2) can be modified and updated. In an exemplary embodiment, the HSM 100 can be configured to modify and update the AC memory location.

After step 409, the method of flowchart 400 transitions to 410, where a chip data memory address location is determined from the connected chip/device. In an exemplary embodiment, the HSM 100 can be configured to read the memory address corresponding to the chip data from the chip data address memory location 230. In embodiments where the memory address is encrypted, the HSM 100 can be configured to decrypt the encrypted memory address.

After step 410, the method of flowchart 400 transitions to step 412, where chip data is read from the chip data memory location 250 that corresponds to the memory address obtained from the chip data address memory location 230. For example, the HSM 100 can be configured to read the chip data from the chip data memory location 250 identified by the memory address read from the chip data address memory location 230.

After step 412, the method of flowchart 400 transitions to step 414, where a chip data certificate (CDC) is generated based on the chip data and the AC read from the connected chip/device. In an exemplary embodiment, the data certificate generator 135 can be configured to generate a CDC based on AC, the chip data, and the chip data encryption key (CDEK). For example, the data certificate generator 135 can be configured to perform a hash function on the AC and chip data using CDEK to generate the CDC.

After step 414, the method of flowchart 400 transitions to step 416, where the regenerated CDC is written to the connected chip/device. In an exemplary embodiment, the HSM 100 is configured to write the regenerated CDC to the validation digital certificate memory location 260.

After step 416, the method of flowchart 400 transitions to step 418, where a modified activation certificate (AC^) is regenerated based on the chip ID obtained from the connected chip/device and an encryption key. In an exemplary embodiment, the activation certificate generator 130 can be configured to generate AC^ based on the chip ID and the second activation encryption key (AEK2). For example, the activation certificate generator 130 can be configured to perform a hash function on the chip ID using AEK2 to generate AC^.

After step 418, the method of flowchart 400 transitions to step 420, where the chip data certificate (CDC) is obtained from the connected chip/device. In an exemplary embodiment, the HSM 100 is configured to read the CDC from the chip data certificate memory location 240.

After step 420, the method of flowchart 400 transitions to step 422, where the previously regenerated and stored CDC are obtained from the connected chip/device. In an exemplary embodiment, the HSM 100 is configured to read the regenerated CDC previously stored in the validation digital certificate memory location 260.

After step 422, the method of flowchart 400 transitions to step 424, where the regenerated CDC is validated. In an exemplary embodiment, the HSM 100 is configured to compare the regenerated CDC from the validation digital certificate memory location 260 to the CDC read from the chip data certificate memory location 240.

If the regenerated CDC matches (e.g., is equal to) the CDC from chip data certificate memory location 240, the HSM 100 determines that the regenerated CDC is valid (YES at step 424), and the method of flowchart 400 transitions to step 426. Otherwise (NO at step 424), the method of flowchart 400 transitions to step 425 where the HSM 100 determines that the activation has failed and the user space remains inaccessible. After step 425, the method of flowchart 400 transitions to step 460, where the flowchart ends.

At step 426, the previously regenerated modified activation certificate (AC^) is written to the connected chip/device. In an exemplary embodiment, the HSM 100 is configured to write the regenerated AC^ to the activation certificate memory location 210.

After step 426, the method of flowchart 400 transitions to step 427, where product information is written to the user space and the user space is locked. In an exemplary embodiment, the method of flowchart 400 can also call and perform the method of flowchart 401 as described with reference to FIG. 4C during or after step 427.

With reference to FIG. 4C, the method of flowchart 401 begins at step 403 and transitions to step 428, where the chip ID and AC^ are obtained from the connected chip/device. For example, the HSM 100 can be configured to read the chip ID and AC^ from the connected chip/device. In an exemplary embodiment, the chip ID can be stored in the digital certificate memory location 220 and the HSM 100 can be configured to read the chip ID from this memory location. The HSM 100 can also read the AC^ from activation certificate memory location 210.

In an alternative embodiment, the HSM 100 can be configured to read the chip ID previously stored in memory 115 of the HSM 100 and/or use the previously generated AC^ (step 418) instead of again obtaining the chip ID and AC^ from the connected chip/device.

After step 428, the method of flowchart 401 transitions to step 430, where it is determined if the modified activation certificate (AC^) identifies the chip/device as a legacy device. In operation, the value of AC^ can be used to determine if the corresponding chip/device is a legacy device that does not require further activation processing. For example, if the value of AC^ is, for example, all zeros, the HSM 100 can determine that the connected chip/device is a legacy device (YES at step 430). If the chip/device is determined to be a legacy device, the method of flowchart 401 transitions to step 444. Otherwise (NO at step 430), the method of flowchart 401 transitions to step 432.

At step 432, where a modified activation certificate (AC^) is regenerated based on the chip ID obtained from the connected chip/device and an encryption key. In an exemplary embodiment, the activation certificate generator 130 can be configured to generate AC^ based on the chip ID and the second activation encryption key (AEK2). For example, the activation certificate generator 130 can be configured to perform a hash function on the chip ID using AEK2 to generate AC^.

After step 432, the method of flowchart 401 transitions to step 434, where the obtained AC^ (e.g., AC^ obtained in step 428) is verified against the regenerated AC^ (e.g., the AC^ regenerated in step 432). In an exemplary embodiment, the HSM 100 can be configured to compare AC^ read from the connected chip/device to the previously regenerated AC^. If the HSM 100 determines that the previously read AC^ and the previously regenerated AC^ match (YES at step 434), the method of flowchart 401 transitions to step 436. Otherwise (NO at step 434), the method of flowchart 401 transitions to step 450 where the HSM 100 determines that the activation has failed.

At step 436, a modified digital certificate (DC^) is obtained from the connected chip/device. In an exemplary embodiment, the HSM 100 is configured to read the DC^ from the digital certificate memory location 220.

After step 436, the method of flowchart 401 transitions to step 438, where a digital certificate is obtained based on the modified digital certificate (DC^) and the modified activation certificate (AC^). In an exemplary embodiment, the HSM 100 is configured to perform an "exclusive or" (e.g., xor, exclusive disjunction, etc.) logical operation on the DC^ and AC^ to recover the DC.

After step 438, the method of flowchart 401 transitions to step 440, where the recovered DC is verified. In exemplary embodiment, the HSM 100 can be configured to generate a test digital certificate (TDC) based on the previously obtained chip ID and to compare the TDC to the recovered DC. If the recovered DC is verified (i.e., TDC=recovered DC) (YES at step 440), the method of flowchart 401 transitions to step 442, where the HSM 100 determines that the activation is successful, and the user space of the memory structure 200 is accessible. Otherwise (NO at step 440), the method of flowchart 401 transitions to step 450 where the HSM 100 determines that the activation has failed and the user space remains inaccessible.

If the chip/device is determined to be a legacy device (YES at step 430 discussed above), the method of flowchart 401 transitions to step 444. At step 444, the digital certificate (DC) is obtained from the connected chip/device. In an exemplary embodiment, the HSM 100 is configured to read the information stored in the digital certificate memory location 220. Because the connected chip/device is a legacy device, the value/information stored in the digital certificate memory location 220 corresponds to a non-modified digital certificate. That is, a legacy device would not have been subjected to the activation method illustrated with reference to FIG. 3 and the writing of a modified digital certificate (DC^) to digital certificate memory location 220 (e.g., steps 330, 335).

After step 444, the method of flowchart 401 transitions to step 446, where the obtained DC is verified. In exemplary embodiment, the HSM 100 can be configured to generate a test digital certificate (TDC) based on the previously obtained chip ID and to compare the TDC to the obtained DC. If the DC is verified (i.e., TDC=DC) (YES at step 446), the method of flowchart 401 transitions to step 442, where the HSM 100 determines that the activation is successful, and the user space of the memory structure 200 is accessible. Otherwise (NO at step 446), the method of flowchart 401 transitions to step 448 where the HSM 100 determines that the activation has failed and the user space remains inaccessible.

After step 442, step 448, or step 450, the method of flowchart 401 transitions to step 460, where the flowchart ends.

Although the method of flowcharts 400 and 401 have been described with reference to the HSM 100, one of ordinary skill in the arts will understand that the HSM 102 can be alternatively or additionally used to perform one or more of the corresponding functions described with reference to the HSM 100.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; or other hardware devices. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A method for securing a device, the method comprising:
   generating a digital certificate based on an identification (ID) associated with the device;
   generating an activation certificate based on the ID and a first encryption key;
   generating a modified activation certificate based on the ID and a second encryption key different from the first encryption key;
   generating a modified digital certificate based on the digital certificate and the modified activation certificate;
   storing the activation certificate in the device; and
   securing the device using the modified digital certificate and the modified activation certificate.

2. The method of claim 1, further comprising:
   determining, using a hardware security module (HSM), a memory location address corresponding to a memory location within the device that is configured to store device data, and storing the device data in the memory location; and
   storing the memory location address in a device data address memory location of the device.

3. The method of claim 1, further comprising:
   generating a chip data certificate based on the activation certificate, device data, and the first encryption key; and
   storing the chip data certificate in a chip data memory location within the device.

4. The method of claim 2, wherein the determining the memory location address comprises encrypting the memory location address to generate an encrypted memory location address; and
   wherein the storing the memory location address comprises storing the encrypted memory location address at the device data address memory location.

5. The method of claim 2, wherein the determining the memory location address further comprises randomly selecting a memory address from two or more available memory addresses as the memory location address.

6. The method of claim 1, further comprising:
   hashing, using a hash function, the ID based on the first encryption key to generate the activation certificate; and
   wherein the generating the modified activation certificate comprises:
      hashing, using the hash function, the ID based on the second encryption key.

7. The method of claim 1, wherein the generating the modified digital certificate comprises performing an xor logical operation on the digital certificate and the modified activation certificate to generate the modified digital certificate.

8. A hardware security module configured to perform the method of claim 1.

9. A method for activating a device, the method comprising:
   reading, from the device, an activation certificate and an identification (ID) associated with the device;
   generating another activation certificate based on the ID and a first encryption key;
   validating the activation certificate based on a comparison of the activation certificate and the other activation certificate;
   decrypting an encrypted memory location address to generate a memory location address;
   retrieving device data from a memory location corresponding to the memory location address;
   generating a first chip data certificate based on the validated activation certificate, the retrieved device data, and a second encryption key different from the first encryption key; and
   activating the device using the first chip data certificate.

10. The method of claim 9, further comprising:
    generating a modified activation certificate based on the ID associated with the device and a third encryption key different from the first and the second encryption keys;
    retrieving a second chip data certificate from a chip data certificate memory location;
    comparing the first chip data certificate to the second chip data certificate; and
    storing the modified activation certificate in an activation certificate memory location based on the comparison.

11. The method of claim 9, further comprising:
    decrypting the device data to generate decrypted device data, wherein the generating the first chip data certificate is based on the activation certificate, the decrypted device data, and the second encryption key.

12. The method of claim 9, wherein the generating the first chip data certificate comprises:
    hashing, using a hash function, the activation certificate and the retrieved device data based on the second encryption key.

13. The method of claim 10, wherein the generating the modified activation certificate comprises:
    hashing, using a hash function, the ID based on the third encryption key.

14. The method of claim 13, wherein the generating the first chip data certificate comprises:
    hashing, using the hash function, the activation certificate and the retrieved device data based on the second encryption key.

15. A hardware security module configured to perform the method of claim 9.

16. A method for activating a device, the method comprising:
    generating a first modified activation certificate based on an identification (ID) associated with the device and a first encryption key;
    retrieving a second modified activation certificate from the device;
    comparing the second modified activation certificate to the first modified activation certificate; and
    retrieving a modified digital certificate from the device based on the comparison, the modified digital certificate having been generated based on the second modified activation and a first digital certificate, wherein the first digital certificate has been generated based on the ID;
    generating a second digital certificate based on the modified digital certificate and the second modified activation certificate;
    generating a test digital certificate based on the ID;
    comparing the second digital certificate to a test digital certificate to verify the second digital certificate; and
    activating the device based on the second digital certificate in response to the second digital certificate being verified.

17. The method of claim 16, wherein the generating the digital certificate comprises performing an xor logical operation on the modified digital certificate and the first modified activation certificate to generate the digital certificate.

18. The method of claim 16, further comprising:
retrieving, from the device, the ID associated with the device;
determining whether the device is a legacy device based on the second modified activation certificate; and
if the device is a legacy device, retrieving, using a hardware security module (HSM), the digital certificate from the device and verifying the digital certificate based on the ID.

19. A hardware security module configured to perform the method of claim 16.

20. The method of claim 18, further comprising:
activating the device based on the digital certificate in response to the digital certificate being verified.

* * * * *